April 11, 1944.   F. J. MALNAR   2,346,174
APPARATUS FOR MARKING COATED ARTICLES
Filed Aug. 27, 1940   2 Sheets-Sheet 1
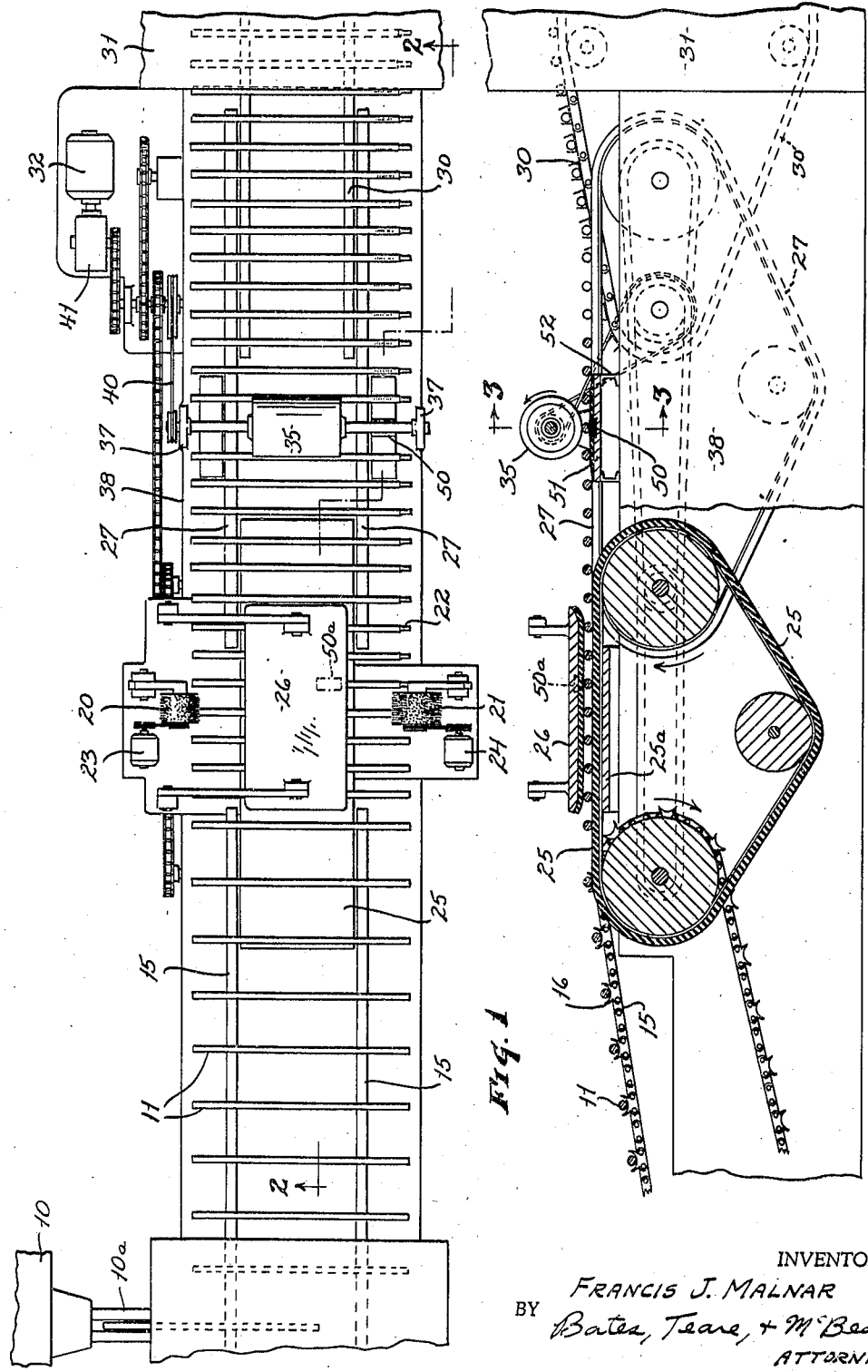
INVENTOR.
FRANCIS J. MALNAR
BY Bates, Teare, & McBean
ATTORNEYS INVENTOR.
FRANCIS J. MALNAR
BY Bates, Teare, & McBean
ATTORNEYS Patented Apr. 11, 1944

2,346,174

UNITED STATES PATENT OFFICE 2,346,174

APPARATUS FOR MARKING COATED ARTICLES

Francis J. Malnar, Euclid, Ohio, assignor to The Champion Rivet Company, Cleveland, Ohio, a corporation of Ohio Application August 27, 1940, Serial No. 354,349

3 Claims. (Cl. 91—16)

This invention relates to an apparatus for imprinting indicia in plastic coatings of rods and has particular application to coated electrodes that are used for welding purposes. Such electrodes are customarily made by forcing the rods through an extruding die by means of which the rods are coated with the plastic material, after which they are transported on conveying apparatus past devices designated for trimming off the burr of plastic material at one end and removing a portion of the material at the opposite end (for the purpose of permitting attachment to an electrode holder) after which they are transported into a drying oven.

The present invention has for an object the provision of means for marking the coating with suitable indicia to indicate, for example, the name of the maker, or the trade-mark of the manufacturer, or the designating characters by means of which the rods can be identified or classified for any particular use. The difficulty heretofore of making suitable marks upon the coating, has been the fact that ink (as in a printing process) could not be satisfactorily applied either in the plastic or dried state of the coating because the ink would run or would not print uniformly.

For manufacturing requirements it is desirable that the marking be done while the rods are being conveyed from the extruding machine to the oven, because at the completion of the travel thereof through the oven the rods are immediately placed into storage containers. While the rods are in transport, however, between the extruding die and the oven, the coating is in a plastic condition, is somewhat moist, and is therefore difficult to handle without destroying the coating or marking it to an objectionable degree. The coating is necessary in the use of the electrode to prevent undue oxidation and to impart certain characteristics to the welds depending upon the nature of the constituents of the coating material.

The present invention has produced a satisfactory apparatus of marking coated electrodes while the coating material is in a plastic condition, and while the rods are being transported from the extruding machine to the oven. This is accomplished by causing the electrode to move between an impression die and a compression roller and by supporting the electrode during the impression operation in a manner that will afford adequate rigidity without impairment of the forward motion thereof.

Figure 3:
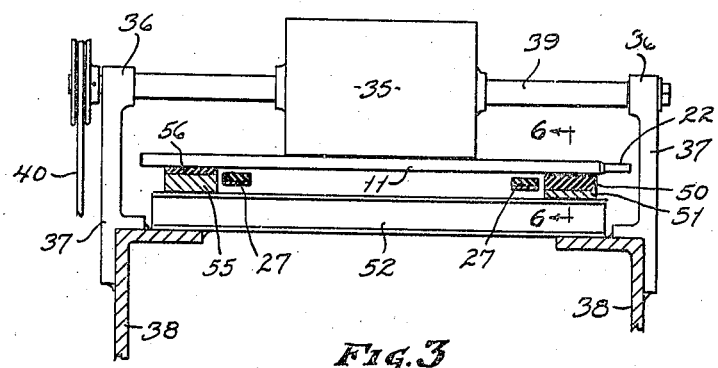
Figure 4:
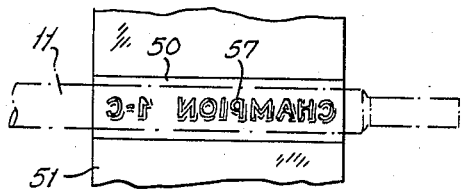
Figure 7:
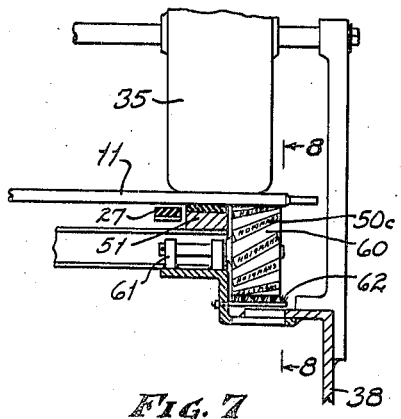
Figure 5:
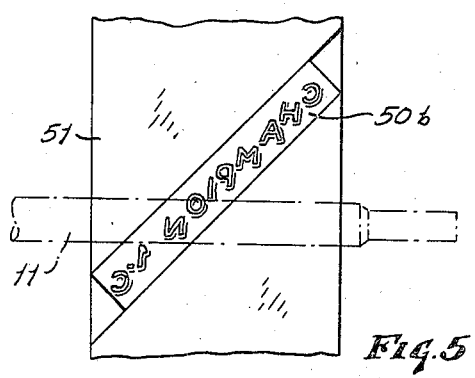
Figure 6:
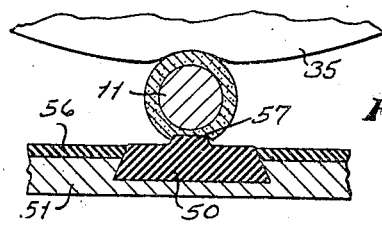
Figure 8:
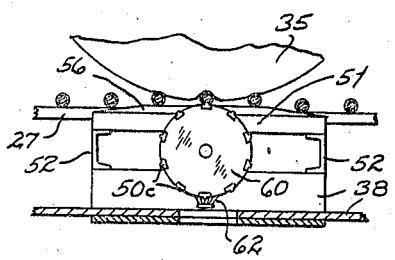

A more particular description of the method and apparatus will hereinafter be set forth in connection with the description of the drawings, wherein Fig. 1 illustrates the top plan view of a machine embodying my invention; Fig. 2 is a section taken on a plane indicated by the offset line 2—2 in Fig. 1; Fig. 3 is a section taken on the line 3—3 in Fig. 2 but showing the mechanism on a scale larger than that shown in Fig. 2; Fig. 4 is a fragmentary plan of the die which is used for marking the electrode coating; Fig. 5 is a view similar to Fig. 4, but showing a modified form of die; Fig. 6 is a section taken on a plane indicated by the line 6—6 in Fig. 3; but on a scale larger than that shown in Fig. 3; Fig. 7 is a fragmentary section similar to Fig. 3, but showing another modification of the die; and Fig. 8 is a section taken on the line 8—8 in Fig. 7.

In Fig. 1 is shown the extruding machine indicated in general at 10, from which electrodes, indicated at 11, are caused to move in an endwise direction on a suitable conveyor 10a from which they are picked up and moved in a transverse direction by a conveyor indicated at 15. This conveyor may have pockets 16 into which the electrodes are individually positioned and by means of which they are caused to move at uniformly spaced distances toward a device which is used for trimming off the burr of coating material at one end and removing a portion of the coating at the opposite end.

The device for trimming off the ends of the coating is shown as embodying a brush 20, which is adapted to remove the burr from one end of the rod and a pair of superimposed brushes, indicated at 21, between which the opposite end of the electrode passes for removing a portion of the coating as shown at 22. Each of these brushes may be driven by an electric motor, at 23 and 24 respectively, in any convenient manner. A suitable arrangement for supporting the electrodes during their passage between the brushes 20 and 21 embodies a conveyor belt 25 which supports the electrodes intermediate the ends thereof and which passes beneath a stationary plate 26. The belt is supported at its upper reach, upon a stationary plate 25a.

As the electrodes pass from beneath the plate 26, they are picked up by a third conveyor in the form of spaced belts, shown at 27, which support the electrodes at spaced points and which serve to convey them to a marking device which embodies the present invention. From the marking device (which will hereinafter be described in detail) the electrodes are carried by the conveyor 27 to a fourth conveyor 30 which, in turn, transports the rods into a drying oven, indicated in general at 31. All of the belts are driven in timed relationship, through suitable gearing, by an electric motor indicated at 32.

The apparatus which is shown for marking the electrodes embodies a compression roller 35 which is journalled for rotation in bearings 36 which, in turn, are carried by brackets 37 mounted on the frame 38. The roller shaft 39 may be driven through a belt 40, by suitable mechanism such as the motor 32 and the reduction gearing indicated in general at 41 in Fig. 1.

The function of the roller 35 is to exert sufficient pressure against the electrodes to effect proper marking thereon and for this purpose the surface of the roll preferably comprises rubber composition having sufficient resiliency to avoid marking the coating and yet be sufficiently firm to force the electrodes against the marking die.

The die referred to is indicated at 50 as being mounted near one end of the electrode upon a plate 51, and the plate, in turn, may be supported upon cross bars 52 that are carried by the frame 38. During the imprinting operation the electrodes are supported at their opposite ends, above the belts 27, upon the plate 51 and die 50 and upon a plate 55 also carried by cross-bars 52. The plates are shown in Fig. 5 as having a composition rubber covering 56 upon which electrodes roll during their passage to and from the imprinting mechanism.

I prefer to mark the electrodes by impressing suitable characters in the coating and this is accomplished by the raised characters on the die 50. The height of the characters is less than the thickness of the coating on the electrode, as a result of which the marking is in the form of an indentation in the coating, preferably not entirely therethrough. I have found that satisfactory results can be produced if the die embodies a rubber composition material having a hardness of about 80 Brinell.

In the drawings, the impression characters on the die are indicated at 57 (Figs. 4 and 5). Alternately, a female die might be employed, having incised characters and producing raised or embossed characters rising from a depressed area in the coating.

To support the electrodes during the imprinting operation, the plates 51 and 55 are shown as being inclined at their ends and raised above the belts 27 at their intermediate portions, as a result of which the electrodes are caused to roll under their own momentum (after leaving the approach part of the belts 27) until the electrodes pass beneath the roller 35 after which they roll under their own momentum off the plates 51 and 55 and onto the delivery end of the belts 27. Inasmuch as the electrodes are rolling under their own momentum after they leave the belts 27, and engage the plates 51 and 55, the roller 35 must move at the same surface speed as the top of the electrodes or twice the lineal speed of the electrodes as measured at their axes.

As a modification of this invention, the die may be incorporated in the stationary plate 26 under which the electrodes are rolled for engagement with the brushes 20 and 21. This location is illustrated by dotted lines at 50a in Figs. 1 and 2.

Injury to the coating on the electrode may be obviated by forming the die as illustrated at 50b in Fig. 5 wherein the characters are set on a line oblique to the path of the electrode. As the electrode is rolled across the die, the impressed characters are so distributed about the surface of the coating that in no region is there an undue amount of indentation, such as might fracture some forms of coating. The compression roller 35 may be formed of sponge rubber, or in the manner of an inflated automobile inner tube, and thus is able to engage the electrode before it reaches the leading end of the die and to remain in engagement until the electrode has traversed the complete line of characters.

There is a tendency for small particles of coating material to adhere to the dies or to become lodged in the recesses in and between the characters, necessitating frequent brushing to clear the die of the accumulated material. The modification illustrated in Fig. 7 provides a self-cleaning device wherein a plurality of dies 50c are arranged on the periphery of a drum 60 immediately adjacent the supporting plate 51 and freely rotatable on supports 61 secured to the frame 38. The drum is caused to rotate by engagement with the moving electrodes and with the deformable roller 35 and at some point in their travel the dies encounter a brush 62 which dislodges any adhering particles. The individual dies are preferably arranged obliquely upon the drum and partially overlapping circumferentially whereby each electrode will receive a complete impression from a single die or part from one and the remainder from the succeeding die.

The foregoing apparatus for marking electrodes having a coating thereon while the coating is in a plastic condition has been found to be effective and such markings have been found to remain on the electrodes at the completion of the passage thereof through the drying oven. As a result, the electrodes may now be marked with suitable indicia to indicate the purpose for which they are intended, thus greatly reducing the hazards of using the wrong electrode without measurably increasing the cost of manufacture.

Reference is made to my divisional application 500,647, filed August 31, 1943, for claims on the method herein illustrated for marking coated articles.

I claim:

1. An apparatus for marking coated welding electrodes while the coating is in a plastic condition comprising a pair of endless belts spaced apart parallel to each other and adapted to support electrodes extending cross-wise of the belts, a stationary support rising higher than the upper reaches of the belts, whereby the electrodes being supported and propelled by the belts come onto the support across which they roll by momentum, a die carried by said support and a counter-pressure roller acting on the electrode in opposition to the die to cause the die to impress the electrode as the electrode rolls across it.

2. An apparatus for marking coated welding electrodes while the coating is in a plastic condition comprising a pair of endless belts spaced apart parallel to each other and adapted to support electrodes extending cross-wise of the belts but engaging the same adjacent their ends, a pair of stationary supports on the outer sides of the belts, said supports rising higher than the upper reaches of the belts, whereby the electrodes being supported and propelled by the belts come on to the supports across which they roll by momentum, a die carried by one of the supports and a counter-pressure roller acting on the electrode in opposition with the die to cause the die to impress the electrode as the electrode rolls across it.

3. An apparatus for marking coated welding electrodes while the same are in plastic condition, comprising a movable conveyor, means for placing thereon a succession of electrodes spaced apart parallel to each other and extending in a direction at right angles to the direction of movement of the conveyor, a stationary marking surface which raises above the conveyor, means for moving the conveyor to carry the electrodes into contact with said marking surface so that the electrodes are rolled forwardly by their own momentum and a pressure roller mounted on an axis parallel with the electrodes to press the electrodes successively against the marking surface and thereby effect an impression in the plastic surface while the electrode is rolling.

FRANCIS J. MALNAR.